United States Patent [19]

Crowley

[11] 4,220,958

[45] Sep. 2, 1980

[54] INK JET ELECTROHYDRODYNAMIC EXCITER

[75] Inventor: Joseph M. Crowley, Champaign, Ill.

[73] Assignee: Xerox Corporation, Stamford, Conn.

[21] Appl. No.: 972,099

[22] Filed: Dec. 21, 1978

[51] Int. Cl.² .......................................... G01D 15/18
[52] U.S. Cl. ..................................................... 346/75
[58] Field of Search ......................................... 346/75

[56] References Cited

U.S. PATENT DOCUMENTS

| | | | |
|---|---|---|---|
| 3,596,275 | 7/1971 | Sweet | 346/75 X |
| 3,769,625 | 10/1973 | Gunn | 346/75 X |
| 3,949,410 | 4/1976 | Bassous et al. | 346/75 |
| 3,979,756 | 9/1976 | Helinski et al. | 346/75 X |
| 4,027,308 | 5/1977 | Fan et al. | 346/75 X |

Primary Examiner—George H. Miller, Jr.
Attorney, Agent, or Firm—Michael H. Shanahan

[57] ABSTRACT

An ink jet printing system is disclosed of the type wherein selected droplets from a continuous stream of droplets are charged and deflected toward a target. The droplet placement on the target is determined by the amount of charge. The system uses an electrohydrodynamic (EHD) exciter to generate the continuous stream. The exciter is composed of one, two, three or more pump electrodes of a length equal to about one half the droplet spacing. The multiple pump electrode embodiments are spaced at intervals of multiples of about one half the droplet spacing or wavelength.

34 Claims, 4 Drawing Figures

INK JET ELECTROHYDRODYNAMIC EXCITER

BACKGROUND

This invention relates to the methods and apparatus for electrohydrodynamically (EHD) generating a continuous stream of fluid droplets. More specifically, this invention relates to an improved ink jet printing system of the type wherein selected droplets from a continuous stream of electrically conductive droplets are diverted to a printing surface or target.

Richard G. Sweet disclosed an ink jet printer of the present type in his U.S. Pat. No. 3,596,275. Central to the printer is the generation of droplets. The droplets are preferred to be generated at a fixed frequency with a constant velocity and mass. To achieve this goal, Sweet discloses three techniques represented in his FIGS. 1, 2 and 10. The first technique is to vibrate the nozzle emitting a column of fluid under pressure. The second technique is to excite a fluid column electrohydrodynamically with a single EHD exciter. The third technique is to impose a pressure variation on the fluid in the nozzle by means of a piezoelectric transducer or the like associated with the cavity-feeding the nozzle. This later technique is prevalent in the existing literature and is used in the IBM 66/40 Printing System, a registered trademark and tradename of the International Business Machine Corporation of Armonk, New York. This product lends itself to being characterized as an ink jet typewriter.

Heretofore, the EHD exciter has not been an attractive device for promoting the formation of droplets compared to the piezoelectric transducer. For one, the Sweet disclosed EHD device requires very high voltages (roughly 2000-6000 volts) and expensive transformers to obtain them. The high voltages represent an electrical complexity, high cost and safety hazard. As should be appreciated, the high voltages needed to excite or pulsate the fluid column also interfered with the subsequent droplet charging step. In contrast, piezoelectric transducers don't interfere with charging and require much lower voltages.

Accordingly, it is a main object of this invention to overcome the limitations of prior EHD exciters.

Another important object of this invention is to devise an EHD exciter capable of operating at efficient voltage levels.

Yet a further object of the invention here is to improve ink jet printing systems of the type using a continuous stream of fluid droplets.

Still another object of my invention is to optimize the efficiency of a single EHD exciter.

Even a further object of the invention is to employ multiple EHD exciters for each nozzle in the formation of droplets from a column of conductive fluid emitted under pressure from the nozzle.

Also, it is an object to space multiple EHD exciters relative to a column of conductive fluid emitted under pressure from a conductive nozzle at intervals that permit one exciter to be compressing the fluid column while another exciter is expanding the fluid column.

SUMMARY

The foregoing and other objects of the present invention are achieved with a single EHD exciter by selecting the length of the single exciter to be about one half the droplet spacing. The objects are achieved with multiple exciters by locating them relative to each other at multiples of approximately one half the droplet spacing.

PRIOR ART STATEMENT

The above Sweet U.S. Pat. No. 3,596,275 discloses the basic concept of an EHD exciter. However, this disclosure is limited to the fundamental operation and does not suggest the novel improved exciters of the instant invention including the single exciter having a length of a half droplet spacing or the multiple exciters located relative to each other at half droplet spacings.

The patent to Ernest Bassous, Lawrence Kuhn and Howard H. Taub, U.S. Pat. No. 3,949,410 discloses an EHD exciter integrated into a nozzle. Specifically, in connection with FIG. 4, they describe the fundamental EHD process first articulated by Sweet in his above patent. Bassous et al report the periodic swelling and non-swelling of a fluid column due to the electric field associated with the geometry at the nozzle orifice. Their disclosure is silent of and unrelated to the droplet spacing as called for in the present invention. At best, they merely state the fluid mechanics principal (at Column 9, lines 41-47) that the wavelength of the swelling (i.e. droplet separation) is given by the velocity of the fluid divided by the frequency of the swelling or perturbations.

The John B. Gunn U.S. Pat. No. 3,769,625 discloses a plurality of electrodes adjacent the pertubations in a fluid column prior to droplet formation. The electrodes are charging electrodes and not EHD exciters or pump electrodes as in the present invention. The piezoelectric transducer 12 shown in his FIG. 1 is the exciter for the generation of the droplets. The multiple electrodes adjacent the fluid column and droplet stream are used merely as the charging device for the droplets. The multiple electrodes are switched by a delay line or the like to keep a charging signal in sync with the moving droplet. In his FIG. 4A, the multiple electrodes 14 are shown against timing pulses that synchronize the application of the video signal with the flight of the droplets. In fact, both 4A and 4B illustrate only one electrode activated in the region prior to droplet formation.

DESCRIPTION OF THE DRAWINGS

Other objects and features of the instant invention are apparent from the present specification and the drawings which are.

DETAILED DESCRIPTION

In the prior art exciters, the length of the exciters have been ignored. Simply put, they are either too short or too long relative to the wavelength of the droplets. The invention here includes the selection of the length t of EHD pump electrode exciters to be from about 0.2S to about 0.8S where S is the spacing between droplets, i.e. wavelength. (See FIGS. 1 and 2).

The preferred pump electrode length t is about one half the droplet spacing sice it is the most efficient. The exciters can be odd multiples of S/2 also. For example, a pump electrode length of (5/2)S is as effective as S/2. The reason is that the last S/2 portion of the pump electrode is what effects the desired droplet formation.

Another important advance of the invention is to use two or more pump electrodes for droplet formation. The key is to have the force exerted by one electrode reinforced by the force exerted by the other. This is illustrated by the following description where two electrodes are spaced at an odd multiple of S/2 and the varying voltages coupled to each are 180 degrees out of phase.

Any phasing may be used provided the voltages coupled to the multiple electrodes are reinforcing each others efforts. For example, if one electrode is exerting a contracting force on a fluid column, the other electrodes should be exerting a reinforcing contracting, expanding or other vector force that tends to promote rather than cancel the first mentioned contracting force. This reinforcement is achievable for any pump electrode spacing provided the phase of the driving voltages are adjusted to reflect the spacing between the two electrodes involved. It is presently understood that the most efficient phasing is either an in-phase or 180 degree out-of-phase relation as described in the following specific embodiments.

Figure 1:
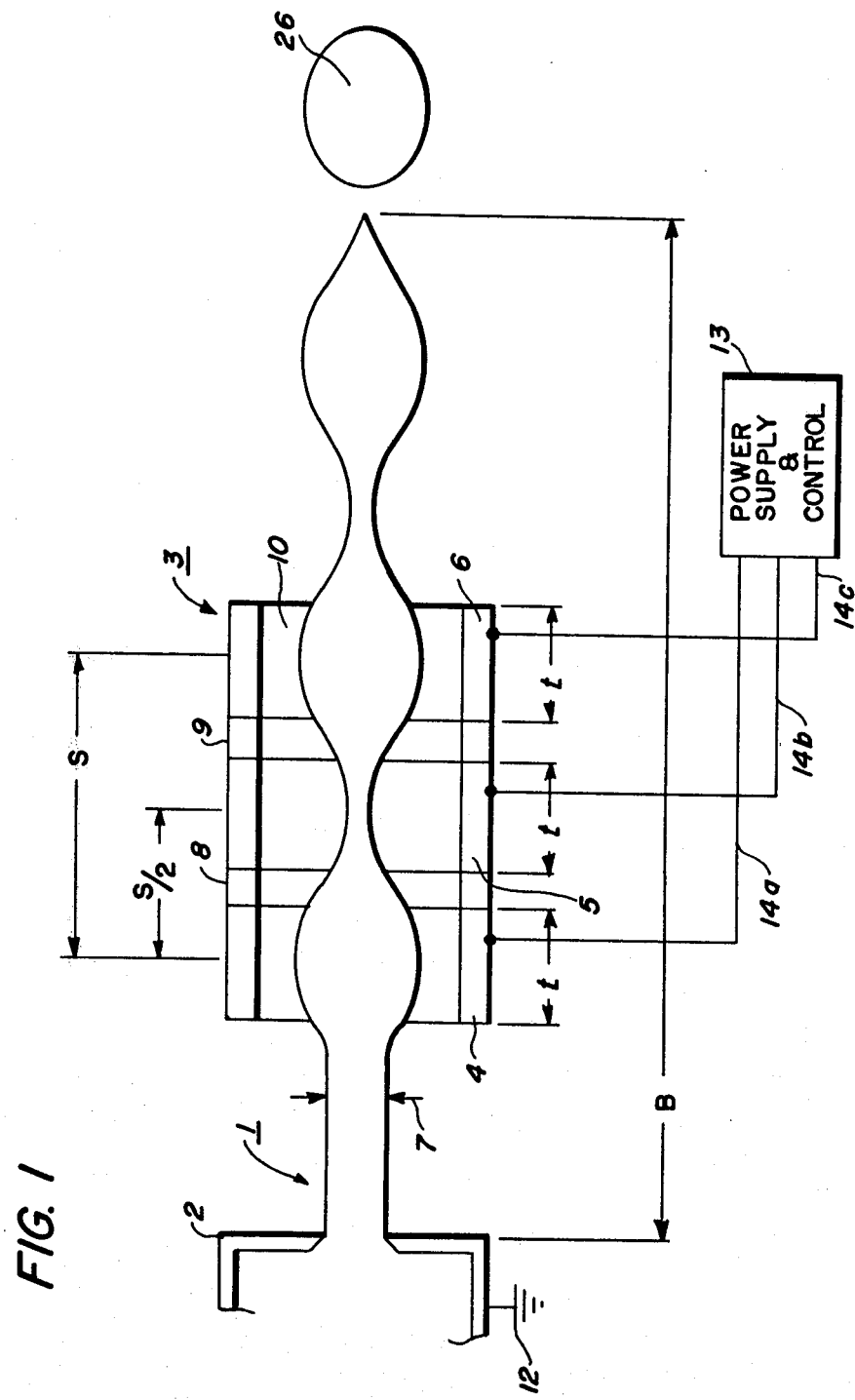
FIG. 1 is a side elevation, in partial section, of a conductive fluid column emitted under pressure from a nozzle, a droplet formed from the fluid column and an EHD exciter according to the present invention using three EHD or pump electrodes for droplet generation.

FIG. 1 shows a fluid Column 1 being emitted from an appropriate nozzle 2. The fluid is forced out of the nozzle by head means (not shown) under a pressure of about 20 to about 120 psi giving the fluid columns or streams having diameters of 1–10 mils a velocity of from about 300–1000 inches per second. The surface tension and other forces tend to create swells in the fluid column that ultimately result in the breakup of the stream into droplets. Sweet (in the above U.S. Pat. No. 3,596,275, the disclosure of which is hereby incorporated by reference) taught that by stimulating or exciting the fluid at or near its natural droplet formation frequency, the droplets in the resultant stream have a fixed spacing, i.e. wavelength, a fixed break-off length, length B in FIGS. 1 and 2, and a constant mass. As reported earlier, Sweet disclosed a nozzle vibrator, an EHD exciter and a piezoelectric transducer as means for periodically stimulating the fluid. As with nearly all basic ideas, however, the disclosed excitation techniques are less than perfect. Sweet's EHD device in particular requires voltage amplitudes in the range of 5000 volts. The vibrating nozzle and piezoelectric devices are subject to noise that is evident in many ways including a jitter on the breakoff length. To suppress the noise in all three types of exciters, the driving energy must be very large to yield an acceptable signal to noise ratio. In contrast, the instant invention is an EHD exciter capable of operating at low voltages—in the 100 volt range—and with a good signal to noise ratio. Consequently, the droplets streams generated using the EHD exciters of the instant invention exhibit significant stability over prior art exciters of all three types disclosed by Sweet.

The EHD exciter 3 includes three pump electrodes 4, 5 and 6. Each electrode is identical being a conductive metal cylinder having an inside diameter larger than the nominal fluid column diameter 7. The pump electrodes are separated by an electrical insulator members 8 and 9. By way of example, the members 8 and 9 are phenolic boards with member 8 plated with copper on two sides to a desired thickness to form pump electrodes 4 and 5 and with member 9 plated with copper on one side to form pump electrode 6. The droplet tunnel 10 is drilled through the sandwich formed when the copper coated boards 8 and 9 are abbutted as shown. The insulators prevent electrical shorting between the pump electrodes. The exciter 3, and the other exciters disclosed herein, can be fabricated from silicon wafers. The wafers can be devised to include the pump electrodes and much of the related circuitry in one integrated unit.

Figure 2:
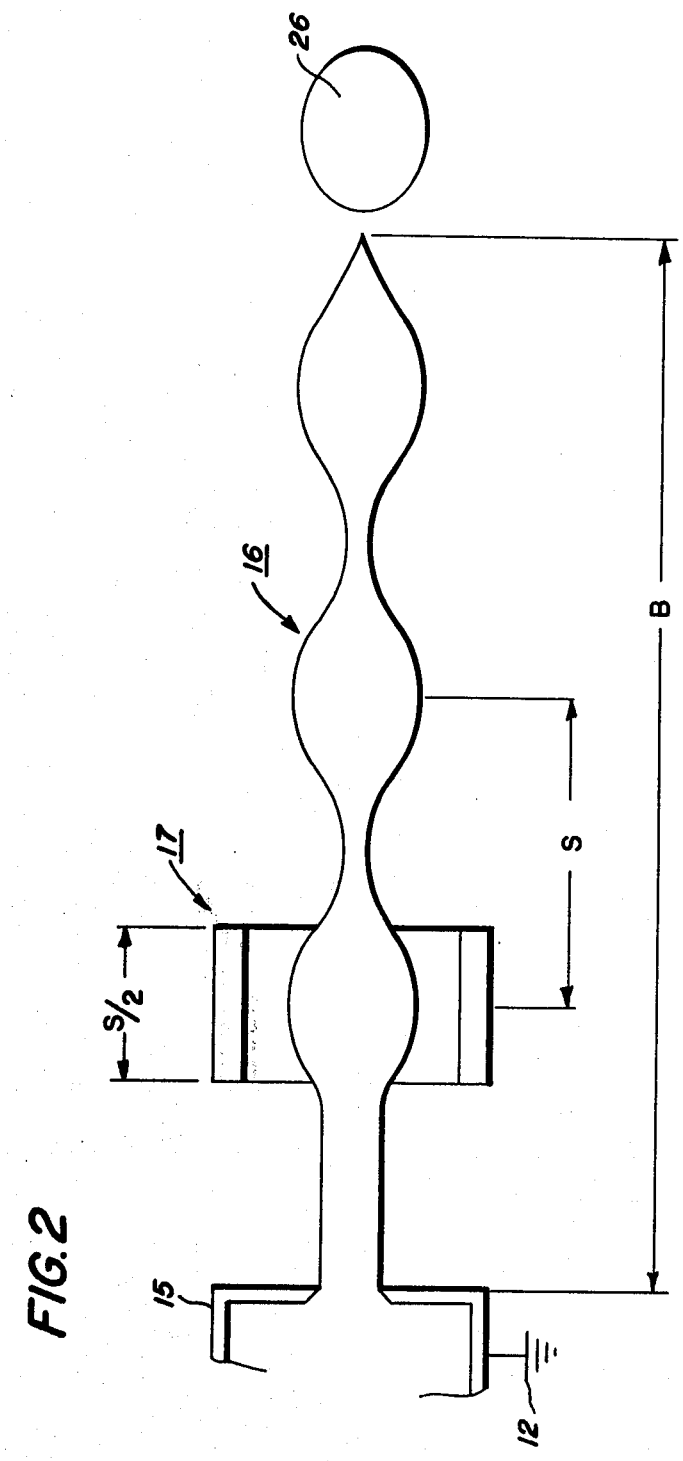
FIG. 2 is a side elevation, in partial section, of a conductive fluid column emitted under pressure from a nozzle, a droplet formed from the fluid column and an EHD exciter according to the present invention using a single EHD or pump electrode for droplet generation.

The EHD exciter is novel in that it is a multielectrode exciter. In addition, it is novel in that it has a definite geometry vis-a-vis the fluid column. The droplet to droplet spacing of the fluid stream generated from column 1 is the peak to peak spacing S of the swells in the fluid column. The distance S is the droplet wavelength which is calculated for a particular system from the fluid velocity divided by the frequency of droplet generation F. In the instant invention as exemplified by device 3, the pump electrodes 4, 5 and 6 are positioned at consecutive half-wavelength intervals. In addition, the voltage coupled to adjacent pump electrodes is 180 degrees out-of-phase. Therefore, the varying electric field established between the pump electrodes 4, 5 and 6 and the fluid column 1 are such that while electrodes 4 and 6 are causing the column to expand, electrode 5 is causing the column to contract. Since the electrodes are positioned at half-wavelength locations, the pumping action of one reinforces that of the others. The pump electrodes do not produce expansion and contraction of the fluid column immediately. But rather, the exciter electrodes 4, 5 and 6 exert a force on the fluid column that accelerates the fluid to produce the expansions and contractions. Also, the swelling is not necessarily apparent at the pump electrodes as illustrated in FIGS. 1 and 2.

An EHD electrode works in the following fashion. A periodic voltage of about 100 volt peak-to-peak amplitude is applied to each pump electrode. The fluid is conductive and is electrically grounded through the conductive nozzle 2 as indicated by grounding means 12. The potential difference between the pump electrode and fluid establishes an electric field that exerts a force on the electric charge near the surface of the fluid column adjacent the electrode. Since the fluid is free in space the fluid volume in the region of the electrode expands and contracts as the magnitude of the potential on the electrode varies relative to the magnitude of the potential coupled to the fluid (ground potential in the case being described). That is, the fluid is accelerated inwardly and outwardly.

The varying voltage applied to the pumping electrodes 4, 5 and 6 comes from the electrical source and control circuitry 13. Any suitable circuitry may be used. For example, the electrodes 4 and 6 are coupled to one end of the output coil of a transformer and the electrode 5 is coupled to the opposite end of the same coil. Since the efficiency of exciting the fluid column at halfwave intervals is effective at low voltages, the transformer may be an inexpensive component with from a 1:1 to about a 10:1 turn ratio. The electrical lead lines 14a, 14b and 14c couple the 180° phase shifted voltages to the three pump electrodes. The frequency of the voltage coupled to the pump electrode establishes the frequency of the droplets, i.e. the wavelengths. The relationship between the two is well understood. For example, when the varying voltage has a pure sine wave shape, the droplet frequency is twice that of the voltage. Other voltage wave shapes have different frequency relationships.

In the example of FIG. 1, the length of the pump electrodes t are all the same. The length t should be from about S/4 to about (9/20)S for maximum efficiency. The break-off length B and droplet frequency is selected using Lord Raleigh's analysis for the shortest length and optimum frequency (or wavelength) for a selected stream velocity and fluid column diameter.

More than three pump electrodes can be used. The three pump electrode exciter of FIG. 1 is effective. Also effective is a two electrode exciter obtained simply by removing either pump electrode 4 or 6. Where compactness is paramount, the single EHD exciter of FIG. 2 is an excellent choice. Here the nozzle 15 emits the fluid column 16 which is stimulated into a desired droplet frequency by EHD exciter 17. In this single electrode embodiment, the length of the electrode, t, is expanded to about S/2, where S is the wavelength of the droplets in the column and droplet stream 16. The half wavelength, single pump electrode 17 yields excellent results at low voltages as with the EHD exciter 3 of FIG. 1. A comparison of the effectiveness of the three EHD's recommended herein is given in FIG. 3.

Figure 3:
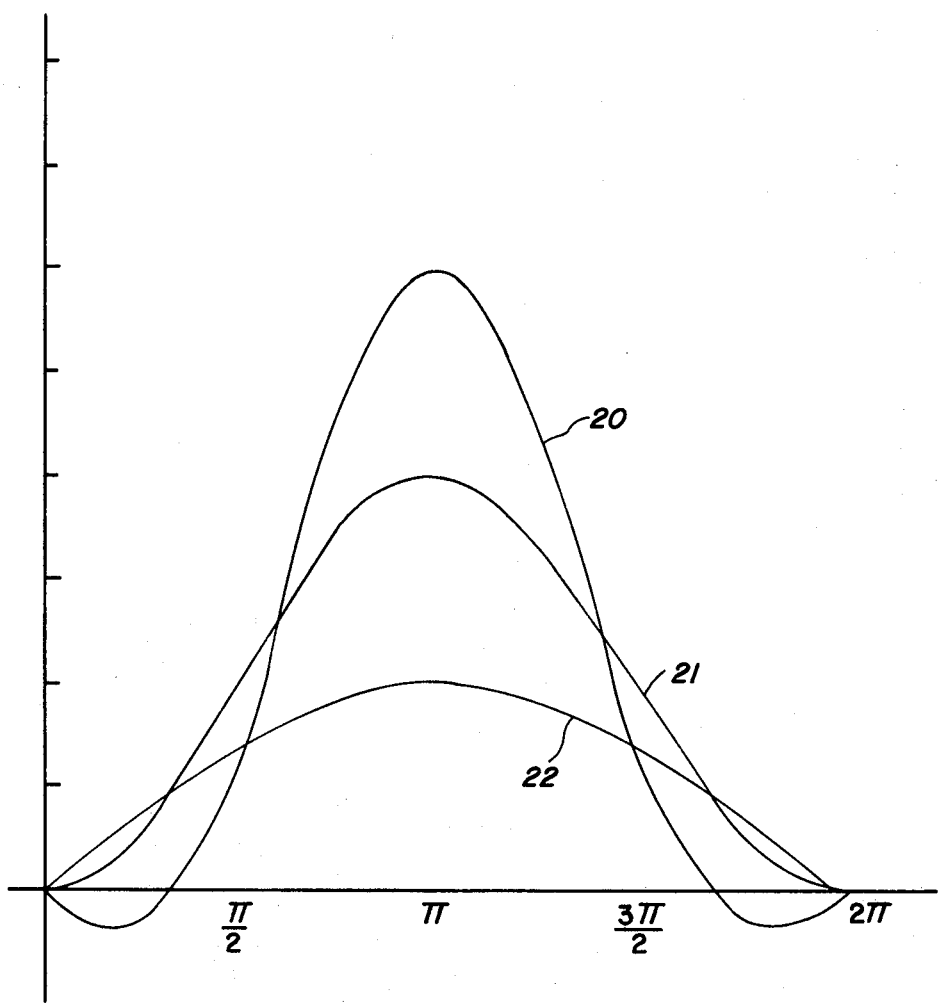
FIG. 3 is a graph of fluid column maximum expansion rate, i.e. velocity away from an initial nozzle orifice diameter, vs. droplet wavelength or spacing expressed in terms of $\pi$ with $2\pi$ being a full cycle or droplet separation. The three curves illustrate the effects of the one, two, and three (or more) pump electrode EHD exciters of my invention. The more electrodes, the sharper and larger the response.

In FIG. 3, curves 20, 21 and 22 represent the amplitude of the velocity or swelling rate of a fluid column plotted against the frequency of the droplets normalized by the transit of the fluid in the exciter. Curve 20 represents the performance of the EHD exciter 3 in FIG. 1, curve 21 the performance of a two pump electrode exciter (exciter 3 with either pump electrode 4 or 6 inactivated) and curve 22 the performance of the single pump electrode exciter 17 in FIG. 2. The increase in the number of electrodes yields an increase in response for a given input voltage. Clearly, for a larger, sharper response, four or more pump electrodes can be used. In addition, the curves 20 and 21 indicate that the response is selective near the driving frequency represented by $\pi$. Those frequencies in the 0-$\pi/2$ and $3\pi/2$-$2\pi$ region are suppressed, thereby improving the signal to noise ratio. The three pump electrode represented by curve 20, of course, exhibits better noise rejection than even the two pump electrode as represented by curve 21.

The single pump electrode represented by curve 22 is one that has a length of about one half the droplet spacing. Although it is not as efficient as the EHD's exciters represented by curves 20 and 21 or as suppressive of harmonics, it nonetheless, is significantly more efficient than the EHD exciter of Sweet.

Another alternative to the above-described one, two and three pump electrode exciters is a combination of the exciters 3 and 17. That is, a multiple pump electrode exciter of excellent efficiency is one wherein each electrode is of a length t of about one half the droplet spacing and the intervals between electrodes is at least one half a droplet spacing. The t=S/2 electrode of FIG. 2 must be spaced at least S/2 from the next electrode unless an infinitely thin insulator 8 of FIG. 1 is used to separate them. The embodiment of FIG. 1 employs a length t of between about S/4 to about (9/20)S. This allows the length t to come as close to S/2 as is practical for most insulators. The sacrifice in optimum length t is offset by the compactness of the EHD device 3.

When physical space is available in a given design, the pump electrodes 4, 5 and 6 of FIG. 1 (or four or more electrodes in other designs), may be separated by multiples of S/2. In fact, if the electrode 4, 5 and 6 are spaced a distance S from each other, the varying voltage coupled to them can be the same phase. The phase to those electrodes that are offset by odd multiples of S/2 must have a varying voltage coupled to them that is 180 degrees out of phase with the adjacent electrode. Simply put, the multiple electrodes must be mutually cooperative in exerting a force on the fluid column. The cooperation in terms of phasing is determined by whether a given pump electrode, relative to the others, is operating on a maxima or a minima, i.e. a peak or a valley, in the columns undulations. The spacings between electrodes may be different as long as they are all multiples of S/2.

Figure 4:
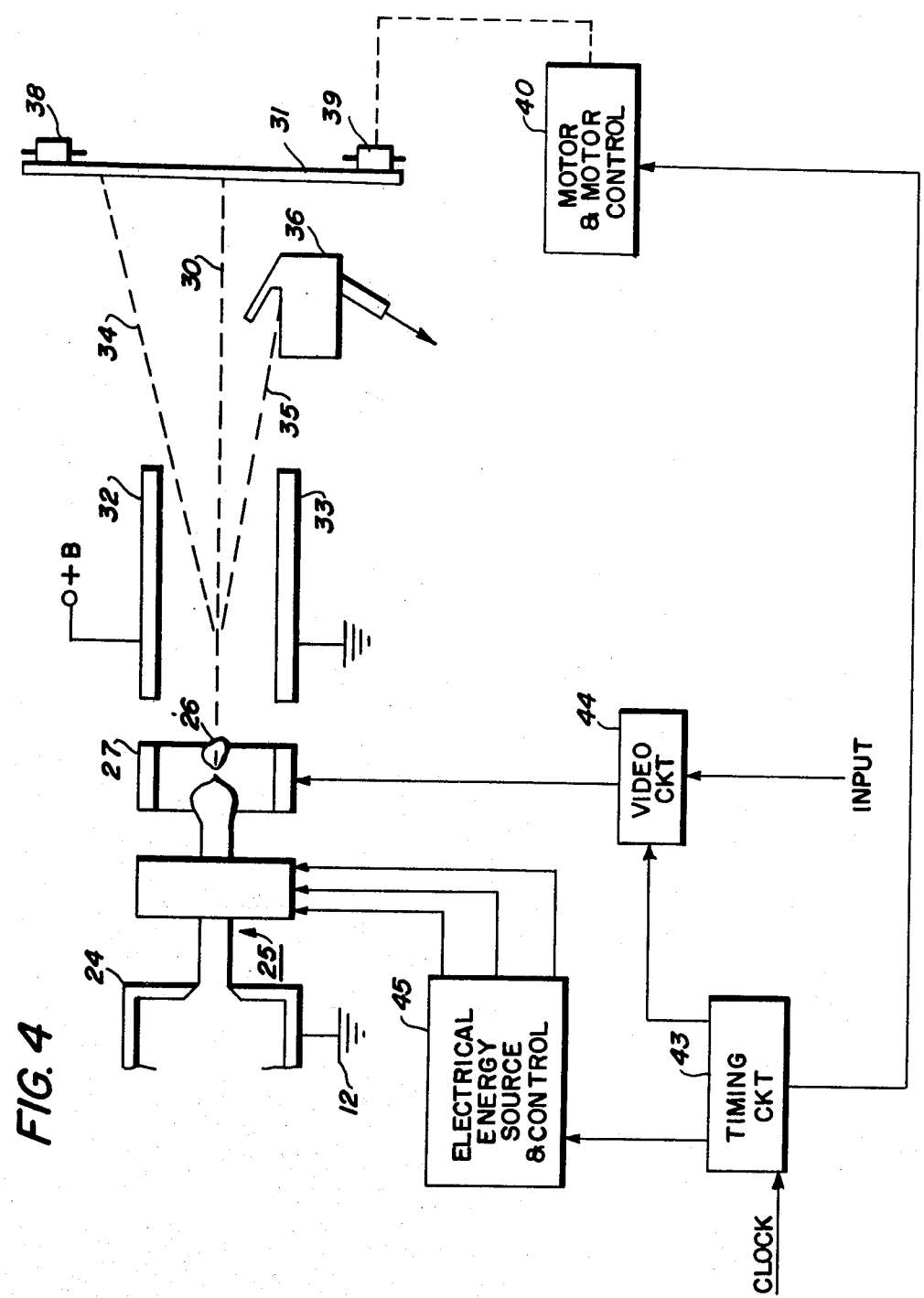
FIG. 4 is a schematic of an ink jet printing system using the three pump electrode EHD exciter of FIG. 1.

FIG. 4 shows the EHD exciter 3 of FIG. 1 in an ink jet system. The system, except for EHD exciter 3 and associated circuitry, is of the type disclosed in the Sweet patent and for particulars not present here the reader is referred to that reference. A conductive fluid is supplied to nozzle 24 under pressure which emits the fluid column 25. Droplets break off from the column as indicated by droplet 26 at a charging electrode 27. The fluid column extends through the EHD exciter 3 where it is stimulated by electric fields by pump electrodes 4, 5 and 6 as shown in detail in FIG. 1.

The droplets, e.g. droplet 26, when uncharged, travel a substantially straight path or trajectory 30 until it impacts target 31. The target is, conventionally, plain paper. The charged droplets, again droplet 24 for example, are deflected by a deflection means including deflection electrodes 32 and 33 to some trajectory between path 30 and the extreme path 34. The exact trajectory varies according to the quantity of charge induced on the droplet at the charging electrode 27. The deflection is in the direction of path 34 for negatively charged droplets when the deflection plates are coupled to ground and +B. Typically, the +B potential is about 2000–4000 volts for plate spacings of 100 mils.

When a droplet 26 is charged positively it follows a path below path 30 such as the trajectory 35. This causes the droplets to go into the gutter 36. Therefore, for the system illustrated, except for small positive charge values, the zero and negatively charged droplets go to the target 31 for printing whereas the positively charged particles go to the gutter 36 for collection and circulation back to the nozzle 24.

The target 31 is supported for movement in a direction normal to the surface of FIG. 4. The target is propelled by feed rollers 38 and 39. This orientation is 90 degrees to that of the printing system of the IBM 66/40 printing system mentioned at the beginning of this specification. The IBM 66/40 printing system has an ink jet system having a single nozzle mounted on a traversing carriage opposite a sheet of plain paper supported on a typewriter platen. As the carriage traverses the platen, the ink jet stream is deflected vertically to compose a line of characters. The platen is incremented one line to initiate the composition of the next line of characters.

In the printing system of FIG. 4, the ink jet apparatus to the left of target 31 is stationary. The motor and motor control circuitry 40, under system control, causes the target to advance normal to the plane of FIG. 4 at a constant velocity. The target velocity is slow compared to the time it takes for a plurality of droplets to compose a line of dots on the target at and between the trajectories 30 and 34. A character is formed on the target in a line by line fashion as the target is fed by the rollers 38 and 39.

The ink jet system of FIG. 4 is expandable by cascading the apparatus side by side. In this case, one line of dots is printed by a plurality of adjacent nozzles. The extremely deflected droplets of one nozzle are one droplet (or pixel) position away from the extremely deflected droplets of nozzles on either side. Offset row configuration can also be employed to give an apparent increase in nozzle density.

In the plural nozzle system described, separate deflection plates, charging electrodes and gutters similar to items 32, 33, 27 and 36 are required. Also, each nozzle may have its own EHD device 3. However, a common EHD device for all the nozzles is an alternative. The common EHD device is, in one embodiment, a single (or two or more) flat conductive member above or below the ink stream. The length t parallel to the stream is the same as the dimensions t in FIGS. 1 and 2. The flat member extends normal to the dimension t some finite length to span all the other fluid columns emitted by adjacent nozzles. Consequently, the flat member excites all the parallel fluid columns simultaneously. The exciting electric field between the fluid column and single flat member electrode is not as efficient as that established by the cylindrical geometry of FIGS. 1 and 2. However, the efficiencies of the S/2 length t, the S/2 spacing and reinforcing voltage phasing are still sufficient to yield excellent droplet generation.

Referring back to FIG. 4, the formation of the droplets is synchronized with the charging process at the charging electrode 27. A system clock at a significant rate above the droplet generation rate is applied to a timing circuit 43. The timing circuit develops timing signals related to the droplet production rate and applies these signals to the video circuit 44, the EHD electrical energy source and control logic circuit 43 and the motor and motor control circuit 40.

The timing signal applied to circuit 45 establishes the frequency of the varying potentials applied to the pump electrodes 4, 5 and 6 at the exciter 3. The phase of the three potentials is depended upon the electrodes spacing which for the case shown is the same as the device of FIG. 1. The potential of electrode 5 is 180 degrees out-of-phase with the phases of the potentials coupled to electrodes 4 and 6. The timing signal coupled to the video circuit 44 gates the video input data to the charging electrode 27 at the instant a droplet 26 is formed. The timing signal coupled to motor circuit 40 synchronizes the movement of the target 31 with the sweep of the droplets between the extreme trajectories 30 and 34. The sweep of the droplets occurs at a much higher rate than the movement of the target.

Other embodiments and alternatives of the described exciters will be apparent to those skilled in the art based on the foregoing description and drawings. The foregoing alternates are intended to be within the scope of the present invention.

What is claimed is:

1. An electrohydrodynamic exciter for promoting the formation of droplets at substantially constant spacings from a column of electrically conductive fluid emitted under pressure from a nozzle comprising a pump electrode adjacent the fluid column including means for coupling to an electrical energy source for establishing a varying electric field for exerting a normal force on the fluid column for promoting droplet formation at substantially constant droplet spacings the length of the electrode being about one half the droplet spacing.

2. The exciter of claim 1 wherein the frequency of the varying electric field gives rise to the frequency of droplet formation.

3. The exciter of claim 1 wherein the pump electrode is located at about a peak or valley of distortions in the fluid column prior to breakup of the column into droplets.

4. The exciter of claim 1 wherein the pump electrode includes a conductive cylinder having a tunnel therein for passage of the fluid column.

5. An electrohydrodynamic exciter for promoting the formation of droplets at substantially constant spacings from a column of electrically conductive fluid emitted under pressure from a nozzle comprising upstream and downstream pump electrodes adjacent the fluid column at consecutive one half droplet spacings, the pump electrodes including means for coupling to an electrical energy source for creating varying electric fields at each electrode with the upstream field being about 180 degrees out of phase with the varying field of the downstream electrode.

6. The exciter of claim 5 further including a third pump electrode adjacent the fluid column at a consecutive one half droplet spacing from the downstream electrode the third electrode including means for coupling to an electrical energy source to create a varying electric field to exert a force on the fluid column, the phase of the varying electric field being about the same as that of the field established by the upstream electrode.

7. The exciter of claim 5 wherein the frequency of the varying electric fields established at the pump electrodes determine the frequency of the droplet formation.

8. The exciter of claim 5 wherein the frequency of the droplets established by the pump electrodes are about equal to the frequency at which the shortest fluid column length is achieved.

9. The exciter of claim 5 wherein the frequency of the varying electric fields established by the pump electrodes are about one half times the frequency of the droplets.

10. A electrohydrodynamic exciter for promoting the formation of droplets from a column of conductive fluid emitted under pressure from a nozzle comprising at least two pump electrodes having a length t parallel to the fluid column of about S/2 where S is the droplet spacing, said pump electrodes being adjacent the fluid column at intervals from each other that are about even or odd number multiples of S/2 and said pump electrodes including means for coupling to a varying electrical energy source for creating varying electrical fields between the electrodes and the fluid column that exert cooperative normal forces on the fluid column for promoting the formation of the droplets.

11. The exciter of claim 10 wherein first and second pump electrodes are spaced at odd number multiples of S/2 from each other and the varying electrical energy coupled to each is about 180 degrees out of phase.

12. The exciter of claim 10 wherein first and second pump electrodes are spaced at even number multiples of S/2 from each other and the varying electrical energy coupled to each is about in phase.

13. The exciter of claim 10 including three or more pump electrodes wherein one of the electrodes is spaced at an odd number multiple of S/2 from one of the other electrodes.

14. An ink jet printing apparatus comprising:
a nozzle for emitting a column of conductive fluid under pressure and
a pump electrode adjacent the fluid column having a length t parallel to the fluid column of about S/2 where S is the spacing between droplets formed from the column at a break-off length from the nozzle B determined by the pressure under which the fluid is emitted and the diameter of the nozzle,
means for coupling an alternating electrical potential to the pump electrode for creating an alternating electric field between the fluid column and pump electrode for promoting the formation of droplets at spacing S,
charging electrode means for charging droplets formed from the fluid column and
means for deflecting charged droplets relative to their uncharged trajectory for printing on a target.

15. The apparatus of claim 14 including a plurality of pump electrodes spaced along the fluid column at successive peak and valley undulations in the fluid column and wherein the coupling means includes means for coupling varying potentials 180 degrees out-of-phase to every other electrode.

16. The apparatus of claim 14 further including a plurality of pump electrodes adjacent the fluid column each being about S/2 in length and separated from each other by an interval that is an even or odd number multiple of S/2 and wherein said coupling means includes means for coupling an alternating potential to each electrode.

17. The apparatus of claim 16 wherein at least two of said pump electrodes are spaced from each other by an interval that is an odd number multiple of S/2 and wherein the coupling means includes means for coupling varying potentials 180 degrees out of phase to the two electrodes.

18. An electrohydrodynamic exciter for promoting the formation of droplets from a column of conductive fluid emitted under pressure from a nozzle comprising
a pump electrode having a length t in the direction of the fluid column that is about S/2 or a whole number multiple thereof where S is the droplet spacing,
said pump electrode having means for coupling to an electrical energy source for establishing a varying electric field between the electrode and fluid column for exerting a normal force on the fluid column for forming droplets at substantially constant spacings S.

19. The exciter of claim 18 further including a plurality of nozzles adapted to be coupled to a fluid source for emission of a plurality of fluid columns, a charging electrode for each fluid column located at the point of drop formation and a pump electrode for each column for exciting each fluid column.

20. The exciter of claim 18 further including a plurality of nozzles adapted to be coupled to a fluid source for emission of a plurality of fluid columns, a charging electrode for each fluid column and a single pump electrode including at least one member that extends across the plurality of fluid columns to excite each of the fluid columns.

21. An electrohydrodynamic exciter for promoting the formation of droplets from a column of conductive fluid emitted under pressure from a nozzle comprising
at least two pump electrodes adjacent the fluid column for establishing varying electric fields between the fluid column and each pump electrode for exerting normal forces on the fluid for the formation of droplets and
means for coupling the pump electrodes to an electrical energy source to establish said varying electric fields with a phase relation so that the force exerted on the fluid column by one pump electrode is reinforced by the force exerted on the fluid column by the other electrode.

22. The exciter of claim 21 wherein the desired phase relation for the fields at the electrodes is selected to suit the spacing between two electrodes.

23. The exciter of claim 21 further including
a nozzle in communication with a fluid source under pressure for emitting a column of fluid
a charging eletrode adjacent the fluid column near the droplet break off point for charging selected droplets formed from the column of fluid.

24. The exciter in the combination of claim 23 further including a plurality of nozzles and charging electrodes positioned side by side to generate a plurality of droplets streams and wherein said two pump electrodes traverse all the fluid columns for promoting the formation of droplets from each fluid column.

25. The exciter of claim 23 further including a plurality of nozzles and charging electrodes positioned side by side to generate a plurality of fluid streams including a plurality of pump electrodes such that at least two pump electrodes are positioned adjacent each fluid column for exciting a fluid column.

26. The exciter in the combination of claim 23 further including charged droplet deflection means between the charging electrode and a target to be printed for deflecting charged droplets as they travel toward the target.

27. The exciter in the combination of claim 26 further including gutter means positioned adjacent the droplet stream to collect droplets not impacting a target.

28. The exciter of claim 21 wherein the pump electrodes have a length t in the direction of the fluid column that is between about 0.2S to about 0.8S where S is the spacing between droplets.

29. The exciter of claim 28 wherein at least one of the pump electrodes has a length t of about S/2.

30. The exciter of claim 28 wherein the spacing between two electrodes is about S/2 and wherein the phase relation to the electric field at the two electrodes is about 180°.

31. The exciter of claim 28 including three exciter electrodes spaced at a distance of about S/2 from center to center along the fluid column.

32. The exciter of claim 31 wherein each pump electrode is the same length t of about 9/20S.

33. The exciter of claim 28 wherein the pump electrodes are spaced from each other by either an even or odd multiple of S/2.

34. The exciter of claim 33 including at least three pump electrodes spaced from each other by even multiples of S/2 or by a combination of even and odd multiples of about S/2.

* * * * *